Oct. 18, 1966
E. HUTTER ETAL
3,280,002
SEAL FOR A CONTROL ROD APPARATUS
Filed March 23, 1965
2 Sheets-Sheet 1
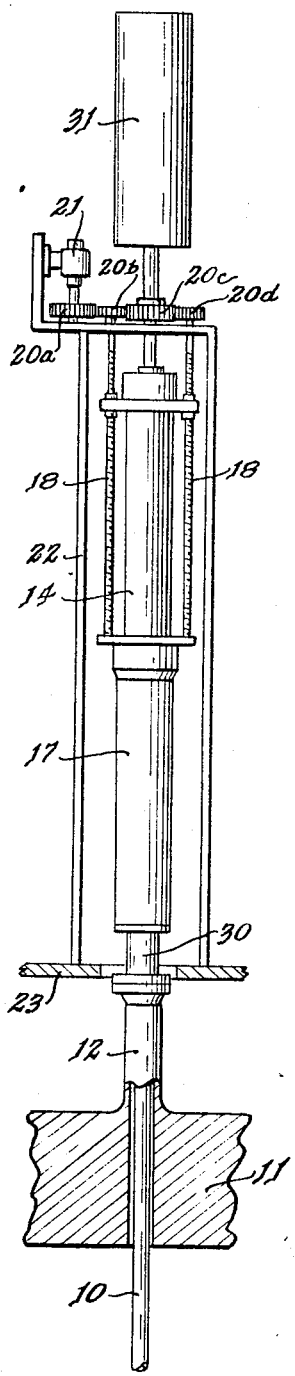
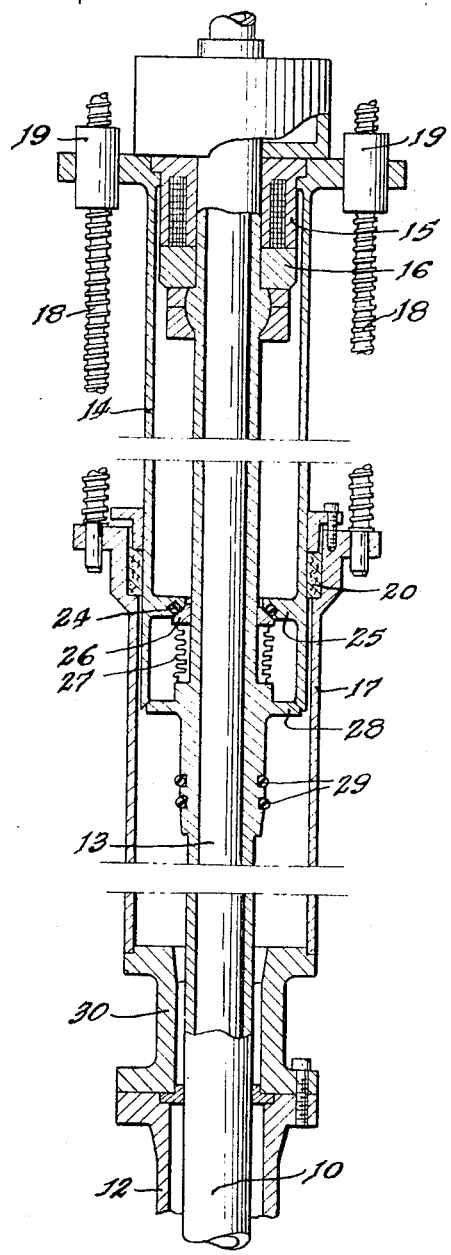
INVENTORS
Ernest Hutter
Thomas E. Sullivan
BY
Attorney

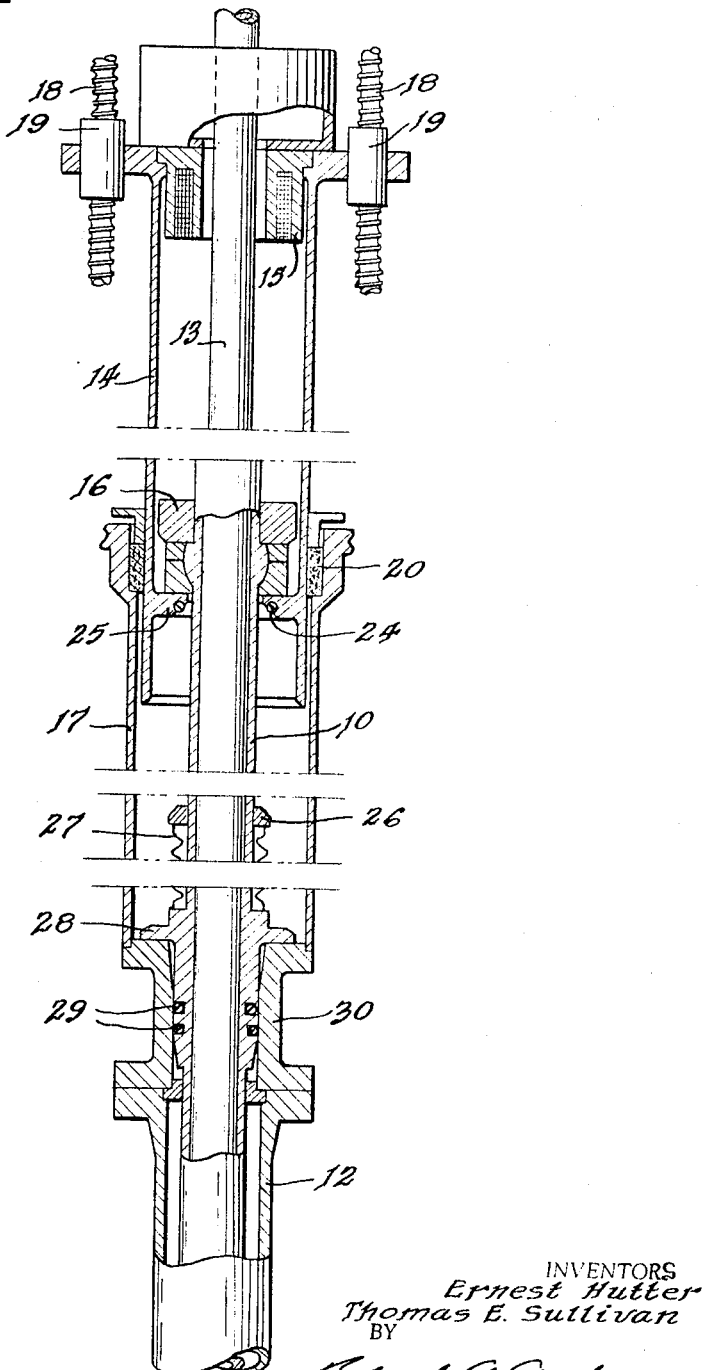

United States Patent Office 3,280,002
Patented Oct. 18, 1966

3,280,002
SEAL FOR A CONTROL ROD APPARATUS
Ernest Hutter, Chicago, and Thomas E. Sullivan, Evergreen Park, Ill., assignors to the United States of America as represented by the United States Atomic Energy Commission
Filed Mar. 23, 1965, Ser. No. 442,221
3 Claims. (Cl. 176—36)

The invention described herein was made in the course of, or under, a contract with the U.S. Atomic Energy Commission.

This invention relates to seals for a rapidly moving member. More specifically, the invention relates to a sealing arrangement that will permit rapid movement of a member with respect to other parts and yet be relatively effective between the member and the other parts.

When in the operation of a nuclear reactor a dangerous condition arises, it is necessary to shut down the reactor in a hurry. This may be accomplished by the very rapid insertion into the reactor, of a control rod that is otherwise moved slowly with respect to the reactor for adjusting reactor operation. For various reasons it may be necessary to have the mechanism for adjusting and rapidly moving the control rod in the reactor, external to the containment vessel for the reactor. Thus there is the problem of sealing the portions of the mechanism that penetrate the containment vessel.

We have solved the problem of permitting rapid movement of a control rod while retaining effective sealing thereof, by providing a compound sealing construction that has one portion sealing the control rod in its withdrawn position during reactor operation and another portion sealing the control rod in its inserted position at reactor shutdown and that yet has no sealing action during the very short period needed for rapid insertions of the control rod for shut-down of the reactor. This absence of sealing during the rapid insertion enables the rapid insertion to occur.

In the drawings:

FIG. 1 is an elevational view, partly in section, of a mechanism for adjusting a control rod in a reactor;

FIG. 2 is a fragmentary longitudinal sectional view showing the adjusting mechanism and the novel seals of the present invention, in position of the control rod during reactor operation; and FIG. 3 is a sectional view similar to FIG. 2 but showing the parts in a position of the control rod during reactor shut-down.

A vertical hollow rod 10 protrudes upward from a cover 11 of a containment vessel of a nuclear reactor through a nozzle 12 forming part of the cover. The hollow rod 10 is adapted to carry at its lower end a vertical control rod (not shown). Engagement by and disengagement from the rod 10 is effected by means of a hollow rod 13, which is located within the rod 10 and is capable of a small amount of longitudinal movement with respect to the rod 10 for the purpose of said engagement and disengagement.

As shown in FIG. 2, during reactor operation, the position of the hollow rod 10, and in turn, of the control rod, is determined by the position of a hollow member 14 carrying an electromagnet 15, which when energized, attracts an armature 16 fixed to the hollow rod 10. The hollow member 14 is adjustably mounted in a hollow member 17, which is secured to the nozzle 12. The hollow member 14 is vertically adjusted by means of a pair of rotatable screws 18 and a pair of nonrotatable ball nuts 19 receiving the screws 18 and fixed to the member 14. Between the hollow members 14 and 17 there is a dynamic packing seal 20, which is effective in all positions of the member 14 with respect to the member 17.

As shown in FIG. 1, the screws 18 are rotated through gears 20a, 20b, 20c, and 20d by a motor 21 carried on top of a framework 22 mounted on a platform 23 attached to the cover 11 of the pressure vessel.

When, as shown in FIG. 2, the hollow rod 10 is in an upper position for reactor operation and the armature 16 on the hollow rod 10 is held against the energized electromagnet 15, a primary static O-ring 24, of neoprene, for example, lodged in an internal flange 25 on the hollow member 14 is engaged by a ring 26 connected to the the hollow rod 10 by resilient bellows 27, which is sealed at its ends to the ring 26 and the hollow rod 10. When the armature 16 is against the electromagnet 15, the ring 26 is against the seal 24, so that the hollow rod 10 and the control rod carried thereby are sealed. In this position an external flange 28 engages the lower end of the hollow member 14.

The hollow rod 10 carries in external peripheral grooves a pair of secondary static O-ring seals 29 of neoprene, for example, which in the position of FIG. 3, are in sealing engagement with the interior of a base portion 30 of the hollow member 17. In the position of FIG. 3, the ring 26 on the hollow rod 10 does not engage the primary O-ring seal 24 on the hollow member 14, and so the seal 24 is not sealing. Conversely, when in the position of FIG. 2, the seal 24 seals by virtue of engagement with the ring 26, the seals 29 are out of the portion 30 and so do not seal. During most of the movement of the hollow rod 10 from the position of FIG. 2 to that of FIG. 3, neither the seal 24 nor the seals 29 are effective as seals. Yet, precisely because they do not seal during this movement, they exert no frictional drag such as could interfere with the free and rapid downward movement of the hollow rod 10.

When the reactor is to be put into operation, the hollow rod 10 is in its lowest position of FIG. 3. The screws 18 will have been rotated sufficiently to bring the electromagnet 15 down to the armature 16. For reactor operation the control rod is moved upward with respect to the reactor by upward movement of the hollow rod 10, produced by upward movement of the hollow member 14 and the electromagnet 15, brought about by rotation of the screws 18. During this slow upward movement of the control rod, it is sealed, because the dynamic seal 20 seals the stationary hollow member 17 to the adjustable hollow member 14 even during movement of the latter, and because ring 26 on the hollow rod 10 engages the seal 24 on the hollow member 14. It is unimportant that the seal 20 exerts a drag on the hollow member 14 as it moves, because the movement is slow. When the reactor reaches a predetermined level of operation, the screws 18 automatically stop rotating. If the actual operation of the reactor departs from the planned operation, the screws 18 again rotate in one direction or the other to move the hollow rod 10 and the control rod up or down to restore planned operation.

When an emergency occurs such as dangerously high level of operation and the reactor must be shut down at once, the electromagnet 15 is deenergized and no longer attracts the armature 16, and the hollow rod drops from the position of FIG. 2 to that of FIG. 3. The seal 24 does not in any way interfere with the drop of the rods, since the ring 26 on the hollow rod 10 merely moves away from the seal 24, with some urging by the bellows 27 by virtue of its spring action. The seals 29 do not interfere with the drop of the rods, since the seals do not engage the portion 30 of the hollow member until the rods almost reach their bottom position of FIG. 3.

When the rod 10 drops to its position of FIG. 3, the hollow member 14 and the electromagnet 15 are lowered by rotation of the screws 18 until contact between the electromagnet 15 and the armature 16 is reestablished.

It might appear that the hollow rod 10 could be cut off at the top so as to terminate within the hollow member 14 and the latter could be closed at its top, so that there would be no need for the seals 24 and 29. In the present construction, however, it has been found necessary to extend the hollow rod 10 beyond the top of the hollow member 14 into a device 31, which includes a pneumatic cylinder and an annular hydraulic shock-absorber cylinder cooperating, respectively, with a pneumatic piston (not shown) and an annular shock-absorber piston (not shown) associated with the portion of the hollow rod 10 and the control rod. The purpose of the not been shown, because they form no part of the present invention. The purpose of the pneumatic cylinder and piston is to supplement gravity in speeding the fall of the hollow rod and the control rod. The purpose of the shock-absorber cylinder and piston is to cushion the fall of the rods.

It is understood that the invention is not to be limited by the details given herein, but that it may be modified within the scope of the appended claims.

The embodiments of the invention in which an exclusive property or privilege is claimed are defined as follows:

1. In combination, a stationary member, an adjustable member, a first seal acting between the stationary and adjustable members during all the positions of the adjustable member, a movable member movable between a first position of engagement with the adjustable member and a second position, a second seal acting between the adjustable and movable members only in the said first position of the movable member, and a third seal acting between the stationary and movable members only in the said second position of the movable member.

2. In combination, a stationary hollow member, an adjustable hollow member telescoping with the stationary hollow member, a dynamic seal surrounded by one of said members and surrounding the other so as to seal in all positions the adjustable member with respect to the stationary member, a movable rod extending through the members, an armature attached to the rod, an electromagnet attached to the adjustable member and attracting the armature to cause the rod to follow the adjustable member during its adjustment with respect to the stationary member, a primary static seal on the adjustable member acting between the adjustable member and the rod only when the armature on the rod is attracted to the energized electromagnet on the adjustable member, and a secondary static seal on the rod acting between the rod and the stationary member only after the rod has moved an appreciable distance from the position in which the armature is attracted to the electromagnet.

3. A nuclear reactor comprising a containment vessel having a cover provided with a nozzle, a stationary hollow member fixed to the nozzle so as to extend therefrom, an adjustable hollow member extending in telescoping relation into the stationary member, a dynamic seal surrounded by the stationary member and surrounding the adjustable member so as to seal in all positions the adjustable member with respect to the stationary member, a movable rod for a control rod extending through the nozzle and the stationary and adjustable members, an armature attached to the movable rod, an electromagnet attached to the adjustable member and attracting the armature to cause the movable rod to follow the adjustable member during its adjustment with respect to the stationary member for adjusting the control rod with respect to the reactor, a primary static O-ring seal mounted on the adjustable member, a ring mounted on the movable rod, a bellows sealed to the ring and to the movable rod for resiliently urging the ring against the primary static seal only when the movable rod is so positioned with respect to the adjustable member for the armature on the movable rod to be attracted against the electromagnet on the adjustable member, a pair of secondary static O-ring seals mounted on the movable rod and acting between the rod and the stationary member only after the movable rod has moved an appreciable distance from the position in which the armature is attracted against the electromagnet.

References Cited by the Examiner
UNITED STATES PATENTS

| 2,841,026 | 7/1958 | Glass | 176—36 |
| 3,154,472 | 10/1964 | Shannon | 176—36 |

L. DEWAYNE RUTLEDGE, *Primary Examiner.*

H. E. BEHREND, *Assistant Examiner.*

UNITED STATES PATENT OFFICE
CERTIFICATE OF CORRECTION

Patent No. 3,280,002                          October 18, 1966

Ernest Hutter et al.

It is hereby certified that error appears in the above numbered patent requiring correction and that the said Letters Patent should read as corrected below.

Column 1, lines 32 and 33, for "withdrawin" read -- withdrawn --; column 2, line 10, after "O ring" insert -- seal --; column 3, lines 14 and 15, strike out "and the control rod. The purpose of the" and insert instead -- within the device 31. These parts have --; line 18, after "rod", first occurrence, insert -- 10 --.

Signed and sealed this 22nd day of August 1967.

(SEAL)
Attest:

ERNEST W. SWIDER
Attesting Officer

EDWARD J. BRENNER
Commissioner of Patents